United States Patent
Zummallen et al.

(10) Patent No.: US 6,749,253 B1
(45) Date of Patent: Jun. 15, 2004

(54) HOOK AND CATCH ASSEMBLY

(75) Inventors: Robert G. Zummallen, Marysville, OH (US); Shawn L. Tarr, Dublin, OH (US); Andrew K. Swayne, Dublin, OH (US); Masahiro Ishikawa, Dublin, OH (US); Pete Cardimen, Powell, OH (US); Skye Malcom, Columbus, OH (US); Henry Dicato, Columbus, OH (US); Matt Wolfe, Hilliard, OH (US); Kenichi Kitayama, Dublin, OH (US); Matthew Plett, Dublin, OH (US); Kris Lemmon, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/397,611

(22) Filed: Mar. 26, 2003

(51) Int. Cl.$^7$ .................................................. B60J 5/04
(52) U.S. Cl. ................................ 296/187.12; 296/146.9
(58) Field of Search .......................... 296/187.12, 146.6, 296/146.9, 202; 49/202

(56) References Cited

U.S. PATENT DOCUMENTS

| 3,788,686 | A | * | 1/1974 | Rossie et al. | 296/146.6 |
| 3,819,228 | A | * | 6/1974 | Cornacchia | 296/146.9 |
| 4,013,317 | A | * | 3/1977 | Reidelbach et al. | 296/146.6 |
| 4,307,911 | A | * | 12/1981 | Pavlik | 296/187.12 |
| 4,438,969 | A | * | 3/1984 | Kamijo et al. | 296/146.9 |
| 4,462,633 | A | * | 7/1984 | Maeda | 296/187.12 |
| 4,488,751 | A | * | 12/1984 | Kling | 296/146.9 |
| 4,915,442 | A | * | 4/1990 | Garnweidner | 296/187.12 |
| 4,917,433 | A | * | 4/1990 | Tomforde | 296/146.5 |
| 5,029,934 | A | * | 7/1991 | Schrader et al. | 296/146.1 |
| 5,364,157 | A | * | 11/1994 | Siedlecki | 296/146.6 |
| 5,395,153 | A | * | 3/1995 | De Smet | 296/146.6 |
| 5,570,922 | A | * | 11/1996 | DeRees et al. | 296/146.6 |
| 6,332,641 | B1 | * | 12/2001 | Okana | 296/146.6 |

* cited by examiner

Primary Examiner—Joseph D. Pape
(74) Attorney, Agent, or Firm—Rankin, Hill, Porter & Clark LLP

(57) ABSTRACT

A hook and catch assembly for use in securing a door to a body of a vehicle. The hook and catch assembly includes a hook that is secured to the door, a rocker panel that the door engages, a catch that is secured to the rocker panel upper surface, and a rocker panel garnish that is disposed over the rocker panel upper surface and the catch. The hook is positioned such that, when the door is in a closed position, the hook extends through a slot in the rocker panel garnish and is received between the catch and said rocker panel upper surface.

14 Claims, 3 Drawing Sheets

HOOK AND CATCH ASSEMBLY

BACKGROUND OF THE INVENTION

1. Field of the Invention

The present invention is generally directed toward vehicle doors assemblies and, more particularly, toward a hook and catch assembly for vehicle doors.

2. Description of Related Art

In the conventional vehicles having a front door and a rear door on each side of the vehicle, the front door is pivotally secured about its forward end to the vehicle body or A-pillar whereas the rear door is pivotally secured to the vehicle body or B-pillar about its forward end. Due to the presence of the B-pillar, the rearward edge of the front door and the forward edge of the rear door are effectively linked to the vehicle body and, as such, are considered to be able to effectively resist side impacts.

In four door vehicles lacking a B-pillar, the front door is pivotally secured about its forward end to the vehicle body whereas the rear door is pivotally secured about its rearward end to the vehicle body. In such constructions, the rearward end of the front door is sealed to the forward end of the rear door. Although the internal structure of the doors, especially adjacent the sealing ends (rearward end of front door/forward end of rear door), can be strengthened, there still exists a need to operably link the doors to the vehicle body at or near this location.

SUMMARY OF THE INVENTION

The present invention is directed toward a hook and catch assembly for securing a vehicle door to a vehicle body. The hook and catch assembly serves to secure and link the vehicle door to the vehicle body so as to strengthen the door against side impacts.

In accordance with the present invention, a hook is secured to an inner surface of the vehicle door and a catch is secured to an upper surface of a vehicle rocker panel against which the door sealingly engages. A rocker panel garnish is disposed over the catch and over the upper surface of the rocker panel so as to generally conceal the catch.

In further accordance with the present invention, the rocker panel garnish has a slot or opening formed therein that is aligned with the catch. When the door is in the closed position, the hook extends through the rocker panel garnish slot and is received between the catch and the rocker panel upper surface so as to secure the door to the vehicle body.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
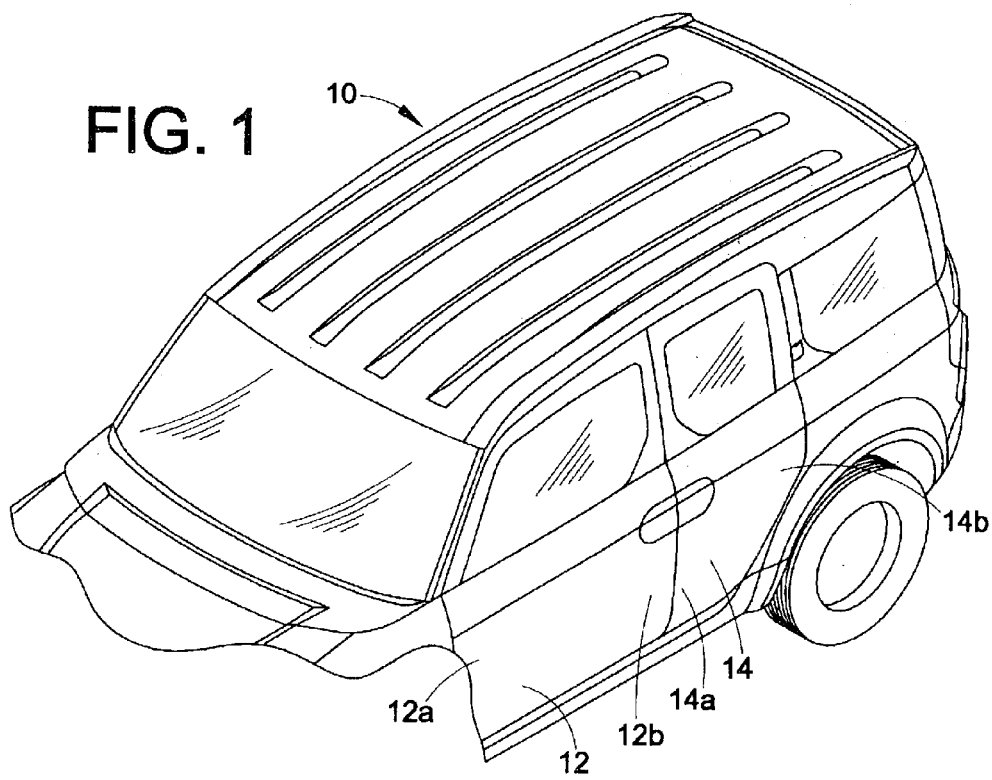
FIG. 1 is a partial perspective view of a vehicle incorporating the hook and catch assembly of the present invention.

With reference to FIG. 1, a vehicle 10 incorporating the hook and catch assembly according to the present invention is illustrated. The vehicle 10 includes a front door 12 and a rear door 14. The front door 12 is pivotally secured at its forward end 12a to the vehicle body at or adjacent the A-pillar 16, whereas the rear door 14 is pivotally secured at its rearward end 14b to the vehicle body at or adjacent the C-pillar 18. Accordingly, the front and rear doors 12, 14 overlap such that the rearward end 12b of the front door 12 is sealingly secured to the forward end 14a of the rear door 14. As such, the vehicle 10 does not include a conventional B-pillar and, accordingly, a relatively enlarged access opening is provided when the front and rear doors are in the open position. For further information on the aforementioned door and door sealing structure, reference should be made to U.S. patent application Ser. No. 10/278,337, filed Oct. 23, 2002, the disclosure of which is expressly incorporated herein in its entirely.

Figure 2:
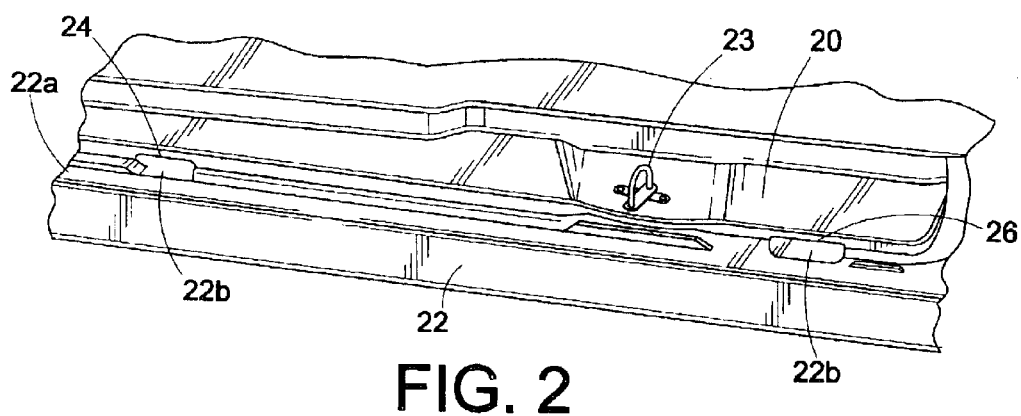
FIG. 2 is a partial perspective view of a rocker panel and rocker panel garnish of the vehicle illustrated in FIG. 1.

With reference to FIG. 2, a portion of a rocker panel 20 of the vehicle 10 is illustrated with the doors 12, 14 in the open position. A garnish or cover panel 20 is disposed over an upper surface 22a (FIG. 5) of the rocker panel 22 and generally conceals or covers the rocker panel 22. The rocker panel garnish 20 has a forward slot or opening 24 and a rearward slot or opening 26 formed therein that face laterally outward toward the doors 12, 14 for purposes that will be apparent from the following discussion. Preferably, the first and second slots 24, 26 are aligned with complementary recesses 22b formed in the rocker panel upper surface 22a, as illustrated, so as to define a relatively enlarged access opening. Also illustrated in FIG. 3 is a catch 23 that is positioned and adapted to receive a latch disposed on the rear door 14.

Figure 3:
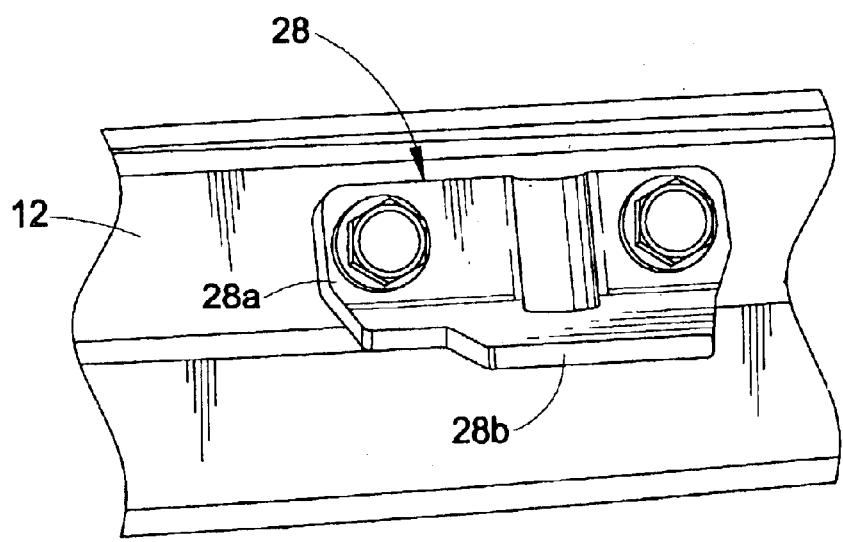
FIG. 3 is a partial perspective view of a lower inner portion of a front door illustrating a hook according to the present invention.

With reference to FIG. 3, an inner, bottom portion 12c of the front door 12 is illustrated. A forward hook 28 is secured to the inner surface of the front door 12. The forward hook 28 is generally L-shaped, having an upper portion 28a secured to the door 12 and a lower or inwardly extending portion 28b extending away from the door 12 and toward the vehicle 10. In the illustrated and preferred embodiment, the hook upper portion 28a is secured to the door 12 by mechanical fasteners, as illustrated. However, it is considered apparent that other known means may be used to secure the hook 28 to the door 12. Further, it is considered apparent that the hook 28 may be formed in various shapes or configurations without departing from the scope and spirit of the present invention.

The illustrated forward hook 28 is disposed on the front door 12 in a position such that, when the front door 12 is closed, the forward hook lower portion 28b extends through the forward slot 24 formed in the rocker panel garnish 20. A substantially identical rearward hook (not shown) is secured to the rear door 14 and is likewise positioned and adapted to extend through the rocker panel garnish rearward slot 26 when the rear door 14 is in the closed position.

Figure 4:
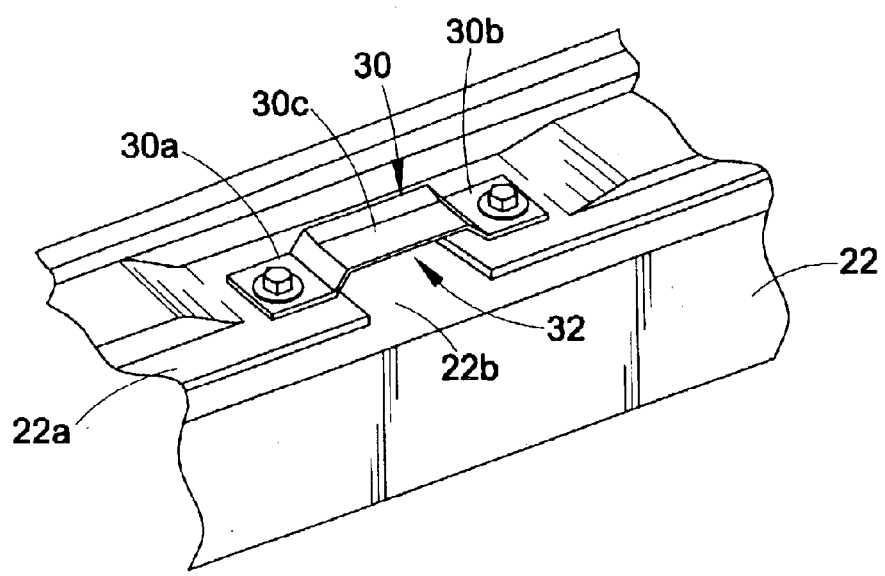
FIG. 4 is a partial perspective view of the rocker panel of FIG. 2, with the rocker panel garnish removed, and illustrating a forward catch according to the present invention.

With reference to FIG. 4, a forward portion of the rocker panel upper surface 22a is shown with the rocker panel garnish removed for purposes of clarity. A forward catch 30 is secured to the rocker panel upper surface 22a at a location that is aligned with the forward slot 24 in the rocker panel garnish 20.

First and second ends 30a, 30b of the forward catch 30 are secured, via mechanical fasteners, to the rocker panel upper surface 22a while a middle portion 30c of the forward catch 30 is spaced a short distance from the rocker panel upper surface 22a and over the recess 22b formed therein. Accordingly, a space 32 for receipt of the forward hook 28 is defined between the forward catch middle portion 30c and the subjacent rocker panel upper surface 22a. A substantially identical rearward catch (not shown) is also provided at a location on the rocker panel upper surface 22a that is aligned with the rearward slot 26 in the rocker panel garnish 20. As will be appreciated from the following discussion, the forward hook 28 is adapted to extend through the forward slot 24 in the rocker panel garnish 20 and be received by the forward catch 30 while the rearward hook is adapted to extend through the rearward slot 26 in the rocker panel garnish 20 and be received by the rearward catch.

Figure 5:
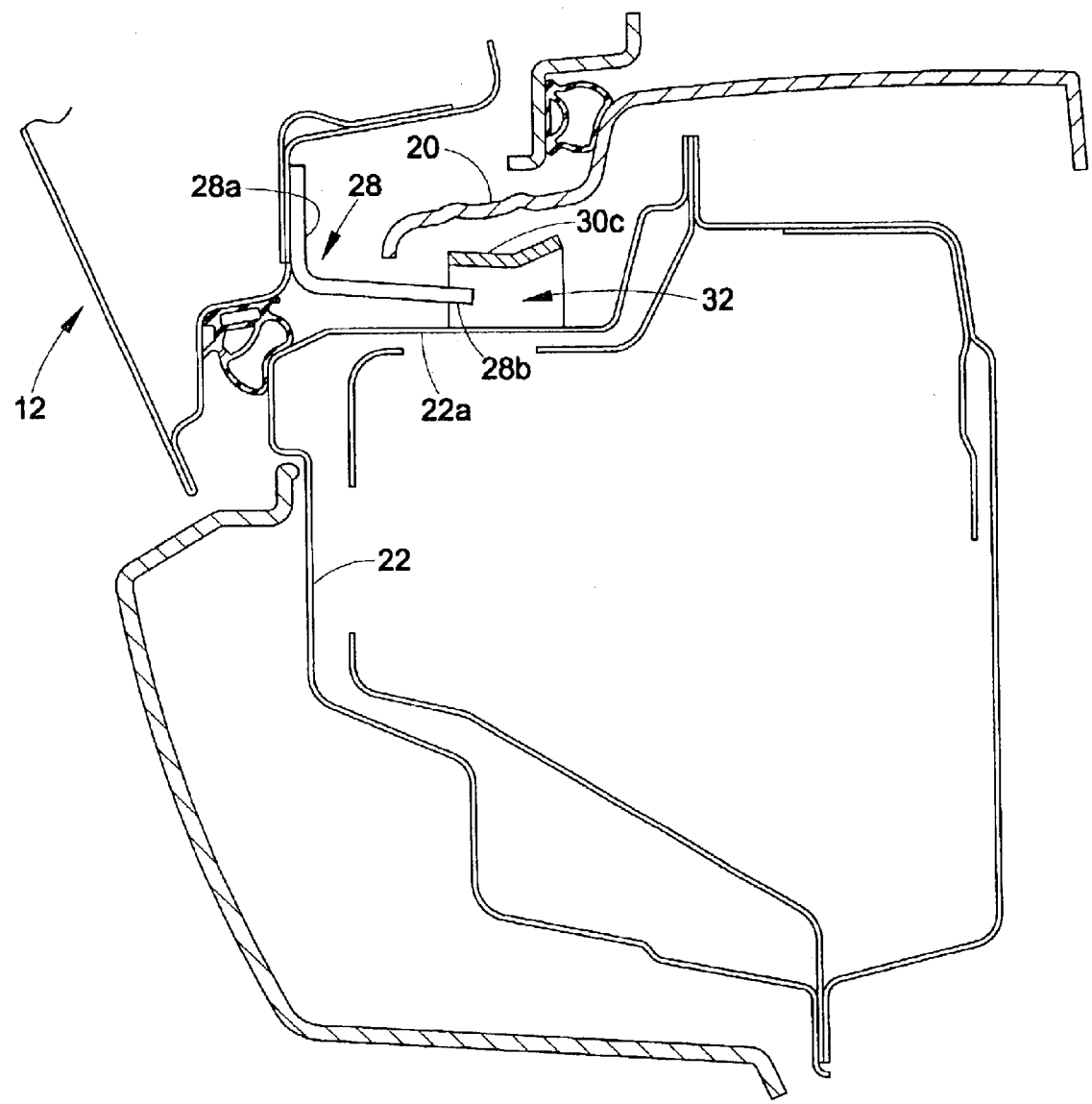
FIG. 5 is a cross-sectional view through the front door illustrating the hook and catch assembly of the present invention in an engaged position.

With reference to FIG. 5, a cross-sectional view through the front door 12, rocker panel 22, rocker panel garnish 20, and the forward catch 30, with the front door 12 in a closed position, is provided. As illustrated, the inwardly extending portion 28b of the forward hook 28 extends away from the front door 12 and through the forward slot 24 in the rocker panel garnish 20 so as to be received in the space 32 between the forward catch 30 and the rocker panel upper surface 22a.

Accordingly, with the hook and catch assembly of the present invention, the vehicle doors are operatively connected and secured to the vehicle body. Therefore, in the event of a side impact at the doors, the connection between the doors 12, 14 and rocker panel 22 provided by the present invention will help to resist lateral (forward/backward) movement, as well as inward movement of the doors 12, 14.

While the present invention has been described with particularity herein, it is considered apparent that the invention is capable of numerous modifications, improvements, and substitutions of parts. Therefore, the present invention is not limited to the particular structure described herein, but rather is to include all of the structures that fall within the scope and spirit of the claims appended hereto.

What is claimed is:

1. A hook and catch assembly for securing a door to a vehicle body, comprising:
    a hook secured to an inner surface of the door, said hook extending inwardly from said door toward said vehicle body;
    a rocker panel against which said door seals;
    a catch secured to an upper surface of said rocker panel;
    a rocker panel garnish disposed over said rocker panel and said catch, said rocker panel garnish defining a slot that is aligned with said catch;
    wherein, when said door is in a closed position, said hook extends through said rocker panel garnish slot and is received by said catch.

2. The hook and catch assembly according to claim 1, wherein said rocker panel garnish generally conceals said catch.

3. The hook and catch assembly according to claim 2, wherein said hook includes a first portion secured to said door and a second portion extending away from said door, said second portion being received within a space defined between the catch and said rocker panel upper surface.

4. The hook and catch assembly according to claim 3, wherein said catch includes first and second ends secured to said rocker panel upper surface and a middle portion spaced from said rocker panel upper surface.

5. The hook and catch assembly according to claim 3, wherein said catch middle portion overlies a recess in the rocker panel upper surface.

6. A hook and catch assembly for securing front and rear doors to a vehicle body, each of said front and rear doors including a forward end and a rearward end, said front door forward end being pivotally secured to the vehicle body and said rear door rearward end being pivotally secured to the vehicle body, whereas said front door rearward end seals against the rear door forward end when said front and rear doors are in a closed position, said assembly comprising:
    a forward hook secured to an inner surface of the front door, said hook extending inwardly from said front door toward said vehicle body;
    a rearward hook secured to an inner surface of the rear door, said hook extending inwardly from said rear door toward said vehicle body;
    a rocker panel against which said front and rear doors seal;
    a forward catch secured to an upper surface of said rocker panel;
    a rearward catch secured to an upper surface of said rocker panel;
    a rocker panel garnish disposed over said rocker panel and said forward and rearward catches, said rocker panel garnish defining a forward slot that is aligned with said forward catch and a rearward slot that is aligned with said rearward catch;
    wherein, when said front and rear doors are in the closed position, said forward hook extends through said rocker panel garnish forward slot and is received by said forward catch and said rearward hook extends through said rocker panel garnish rearward slot and is received by said rearward catch.

7. The hook and catch assembly according to claim 6, wherein said rocker panel garnish generally conceals said forward catch and said rearward catch.

8. The hook and catch assembly according to claim 7, wherein said forward hook includes a first portion secured to said front door and a second portion extending away from said front door, said second portion being received within a space defined between the forward catch and said rocker panel upper surface.

9. The hook and catch assembly according to claim 8, wherein said rearward hook includes a first portion secured to said rear door and a second portion extending away from said rear door, said second portion being received within a space defined between the rearward catch and said rocker panel upper surface.

10. The hook and catch assembly according to claim 9, wherein said forward catch includes first and second ends secured to said rocker panel upper surface and a middle portion spaced from said rocker panel upper surface.

11. The hook and catch assembly according to claim 10, wherein said rearward catch includes first and second ends secured to said rocker panel upper surface and a middle portion spaced from said rocker panel upper surface.

12. The hook and latch assembly according to claim 11, wherein said catch middle portion overlies a recess in the rocker panel upper surface.

13. The hook and catch assembly according to claim 10, wherein said forward catch includes first and second ends secured to said rocker panel upper surface and a middle portion spaced from said rocker panel upper surface.

14. The hook and latch assembly according to claim 13, wherein said catch middle portion overlies a recess in the rocker panel upper surface.

* * * * *